US010848021B2

United States Patent
Oner et al.

(10) Patent No.: US 10,848,021 B2
(45) Date of Patent: Nov. 24, 2020

(54) SWITCHED RELUCTANCE MACHINE WITH SHORT FLUX PATH

(71) Applicant: Enedym Inc., Hamilton (CA)

(72) Inventors: Yasemin Oner, Hamilton (CA); Berker Bilgin, Hamilton (CA); Ali Emadi, Burlington (CA)

(73) Assignee: Enedym Inc., Hamilton (CA)

( * ) Notice: Subject to any disclaimer, the term of this patent is extended or adjusted under 35 U.S.C. 154(b) by 221 days.

(21) Appl. No.: 16/188,727

(22) Filed: Nov. 13, 2018

(65) Prior Publication Data

US 2019/0148998 A1 May 16, 2019

Related U.S. Application Data

(60) Provisional application No. 62/585,217, filed on Nov. 13, 2017.

(51) Int. Cl.
| | |
|---|---|
| *H02K 1/24* | (2006.01) |
| *H02K 19/10* | (2006.01) |
| *H02P 25/098* | (2016.01) |
| *H02K 37/04* | (2006.01) |
| *H02K 19/24* | (2006.01) |
| *H02K 1/14* | (2006.01) |

(52) U.S. Cl.
CPC .......... *H02K 1/246* (2013.01); *H02K 19/103* (2013.01); *H02K 19/24* (2013.01); *H02K 37/04* (2013.01); *H02P 25/098* (2016.02); *H02K 1/14* (2013.01); *H02K 2213/03* (2013.01)

(58) Field of Classification Search
CPC ...... H02K 1/246; H02K 19/103; H02K 37/04; H02K 19/24; H02K 1/14; H02K 2213/03; H02P 25/098
See application file for complete search history.

(56) References Cited

U.S. PATENT DOCUMENTS

| | | | |
|---|---|---|---|
| 4,883,999 | A | 11/1989 | Hendershot |
| 5,111,095 | A | 5/1992 | Hendershot |

OTHER PUBLICATIONS

J. D. Widmer et al., "Optimization of an 80-kW Segmental Rotor Switched Reluctance Machine for Automotive Traction", IEEE Transactions on Industry Applications, vol. 51, No. 4, Jul.-Aug. 2015, pp. 2990-2999.

(Continued)

*Primary Examiner* — Mohamad A Musleh
(74) *Attorney, Agent, or Firm* — Bereskin & Parr LLP/S.E.N.C.R.L., S.R.L.

(57) ABSTRACT

Various embodiments are described herein for switched reluctance machine configurations. In at least one embodiment, a switched reluctance machine configured according to the teachings herein comprises an axially extending shaft, an axially extending rotor mounted to the shaft, the rotor having a plurality of salient rotor poles, an axially extending stator disposed coaxially and concentrically with the rotor, the stator having a plurality of salient stator poles protruding radially from the stator towards the rotor poles, and a plurality of electrical coils wound about the stator poles to define a plurality of phases of the switched reluctance machine, where a number of rotor poles can be determined according to the following equation and at least one constraint condition:

$$N_r = \frac{LCM(N_s, N_r)}{2 \times N_{ph}}.$$

12 Claims, 15 Drawing Sheets

(56) References Cited

OTHER PUBLICATIONS

B.C. Mecrow et al., "Switched Reluctance Motors with Segmental Rotors", IEE Proceedings—Electric Power Applications, vol. 149, No. 4, Jul. 2002, pp. 245-254.

M. T. Khor et al. "A 3-phase 12/10 asymmetrical switched reluctance motor," 2005 European Conference on Power Electronics and Applications, Dresden, 2005, pp. 9 pp.-p. 9.

Junfang Bao et al., "Comprehensive analysis of novel three-phase 12/10 switched reluctance motor", Abstract, International Conference on Electrical Machines and Systems (ICEMS), Busan, 2013, pp. 592-596.

Y. Hu et al. "Investigation on a Multimode Switched Reluctance Motor: Design, Optimization, Electromagnetic Analysis, and Experiment", Abstract, IEEE Transactions on Industrial Electronics, vol. 64, No. 12, Dec. 2017, pp. 9886-9895.

Jacek F. Giearas, "Electrical Machines, Fundamentals of Electromechanical Energy Conversion", CRC Press, Aug. 2016, pp. 85-87, 106.

SWITCHED RELUCTANCE MACHINE WITH SHORT FLUX PATH

CROSS-REFERENCE TO RELATED CASES

This application claims the benefit of U.S. Provisional Application Ser. No. 62/585,217, filed Nov. 13, 2017, which is incorporated by reference herein.

FIELD

Electric machines have been applied as motors and generators in a wide range of industries for more than a century. A reluctance machine is an electric machine in which torque is produced by the tendency of the movable part of the machine to move into a position where the inductance of an excited winding is maximized. An SRM is a type of a reluctance machine where the windings are energized as a function of the position of the movable part of the machine.

Conventional SRMs typically include one stator and one rotor, where the stator includes windings on the stator teeth to generate electromagnetic field and the rotor in the electromagnetic field has the tendency to align with the stator to achieve maximum inductance. The rotor rotates as long as the stator excitation switches successfully. However, conventional configurations of SRMs have conventional concentrated windings that may result in long flux paths, high torque ripple and increased core losses.

SUMMARY

In one aspect of the disclosure, in at least one embodiment described herein, there is provided a switched reluctance machine comprising: an axially extending shaft; an axially extending rotor mounted to the shaft, the rotor having a plurality of salient rotor poles; an axially extending stator disposed coaxially and concentrically with the rotor, the stator having a plurality of salient stator poles protruding radially from the stator towards the rotor poles; and a plurality of electrical coils wound about the stator poles, the plurality of electrical coils including a plurality of separate phase coils defining a plurality of phases of the switched reluctance machine, wherein a number of rotor poles is related to a number of stator poles, a number of stator teeth, and a number of phases, according to $$N_r = \frac{LCM(N_s, N_r)}{2 \times N_{ph}}$$

and at least one constraint condition, wherein $N_{ph}$ is the number of phases, $N_s$ is the number of stator poles, $N_r$ is the number of rotor poles, and LCM is the lowest common multiple of number of stator poles and number of rotor poles, and wherein the at least one constraint comprises the number of rotor poles being greater than the number of stator poles.

In some embodiments, the at least one constraint condition comprises an even number of rotor poles, and an even number of stator poles.

In some embodiments, the at least one constraint condition comprises winding adjacent stator poles with electrical coils having opposite polarities.

In at least one embodiment, the switched reluctance machine, when in operation, generates at least one short flux-path.

In some embodiments, the stator is generally symmetric, and the plurality of stator poles are equidistant from each other.

In some embodiments, the rotor is generally symmetric, and the plurality of rotor poles are equidistant from each other.

In another aspect, in at least one embodiment described herein, there is provided a method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles. The switched reluctance machine further comprises a plurality of electrical coils wound about the plurality of stator poles to define a plurality of phases of the switched reluctance machine, where the method comprises determining a number of rotor poles according to $$N_r = \frac{LCM(N_s, N_r)}{2 \times N_{ph}}$$

and at least one constraint condition, wherein $N_{ph}$ is the number of phases, $N_s$ is the number of stator poles, $N_r$ is the number of rotor poles, and LCM is the lowest common multiple of number of stator poles and number of rotor poles and wherein the at least one constraint condition comprises the number of rotor poles being greater than the number of stator poles.

In some embodiments, the at least one constraint condition comprises an even number of rotor poles, and an even number of stator poles.

In some other embodiments, the at least one constraint condition comprises winding adjacent stator poles with electrical coils having opposite polarities.

In at least one embodiment, the switched reluctance machine, when in operation, generates at least one short flux-path.

In some embodiments, the stator is generally symmetric, and the plurality of stator poles are equidistant from each other.

In some other embodiments, the rotor is generally symmetric, and the plurality of rotor poles are equidistant from each other.

Other features and advantages of the present application will become apparent from the following detailed description. It should be understood, however, that the detailed description and the specific examples, while indicating embodiments of the application, are given by way of illustration only and the scope of the claims should not be limited by these embodiments, but should be given the broadest interpretation consistent with the description as a whole.

DRAWINGS

Figure 1:
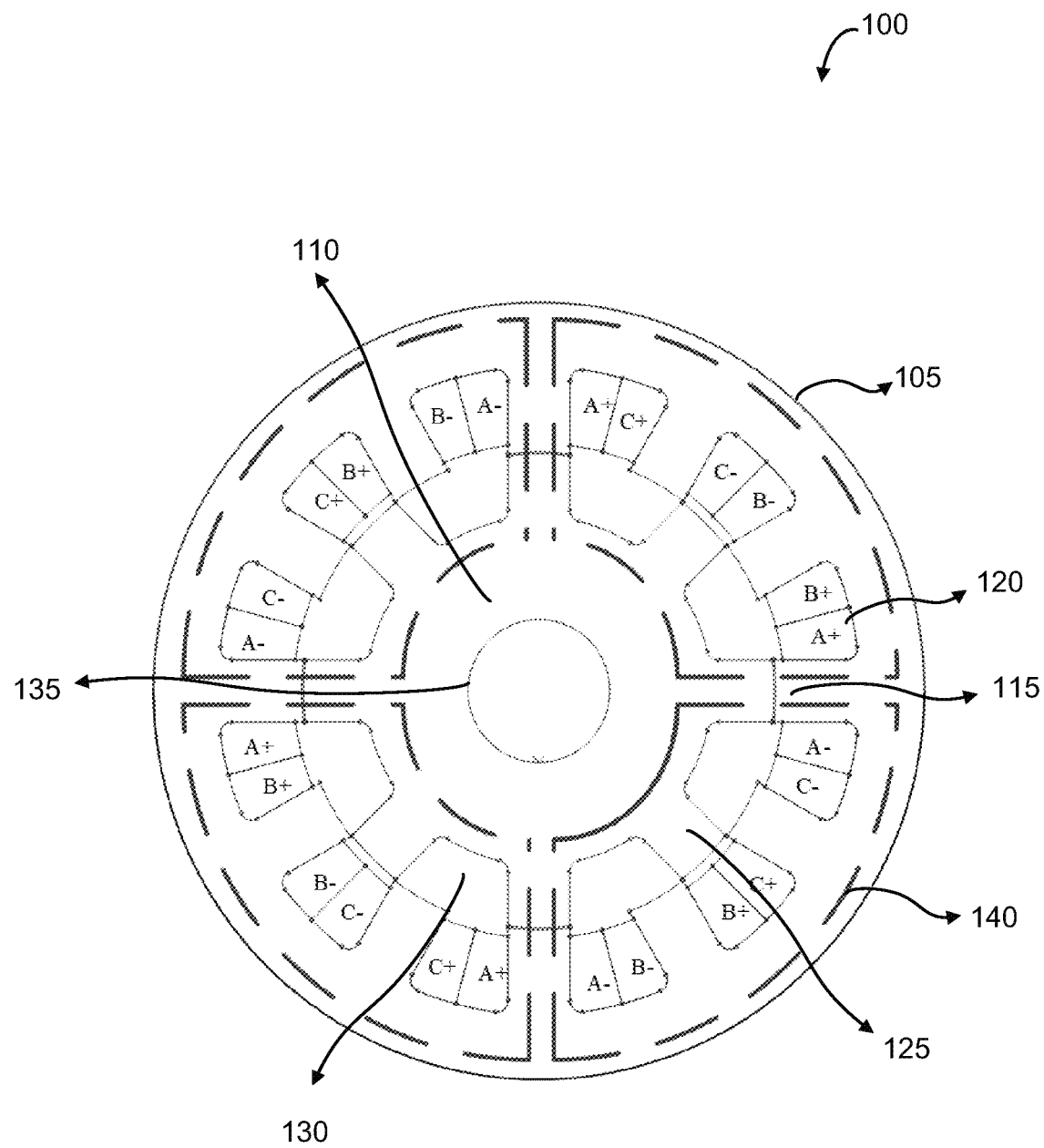
FIG. 1 shows a cross-sectional view of a switched reluctance machine according to an example.

The skilled person in the art will understand that the drawings, described below, are for illustration purposes only. The drawings are not intended to limit the scope of the applicants' teachings in anyway. Also, it will be appreciated that for simplicity and clarity of illustration, elements shown in the figures have not necessarily been drawn to scale. Further, where considered appropriate, reference numerals may be repeated among the figures to indicate corresponding or analogous elements.

DESCRIPTION OF VARIOUS EMBODIMENTS

Unless otherwise indicated, the definitions and embodiments described in this and other sections are intended to be applicable to all embodiments and aspects of the present application herein described for which they are suitable as would be understood by a person skilled in the art.

In understanding the scope of the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

Terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

As used in this application, the singular forms "a", "an" and "the" include plural references unless the content clearly dictates otherwise.

In embodiments comprising an "additional" or "second" component, the second component as used herein is physically different from the other components or first component. A "third" component is different from the other, first, and second components, and further enumerated or "additional" components are similarly different.

The term "and/or" as used herein means that the listed items are present, or used, individually or in combination. In effect, this term means that "at least one of" or "one or more" of the listed items is used or present.

In the various embodiments disclosed herein, switch reluctance machines (SRMs) with a multi-phase wound stator and a rotor are disclosed. The SRMs disclosed herein are configured to generate short-flux paths, and have a rotor pole and a stator pole numerical relationship of $$N_r = \frac{LCM(N_s, N_r)}{2 \times N_{ph}},$$

where $N_s$ is the number of stator poles and $N_r$ is the number of rotor poles with $N_s < N_r$, and the number of rotor and stator poles are an even number.

In addition, in the various embodiments disclosed herein, the flux paths in the SRMs are reduced by using winding schemes where pairs of adjacent poles of the stator have opposite polarities. In such embodiments, the magnetic flux circulates in two independent loops to make a short flux path leading to lower core losses and improved torque capabilities.

FIG. 1 shows a cross-section of an example three-phase SRM 100. SRM 100 is an example of a switched reluctance machine having a stator 105 and a rotor 110. As shown, the stator 105 and rotor 110 are disposed concentrically and coaxially with one another and with the shaft 135. In the SRM 100, the rotor 110 is positioned radially inward of the stator 105.

The SRM 100 includes salient poles on the stator 105 and the rotor 110. In SRM 100, the stator 105 has twelve (12) stator poles 115 and a rotor 110 with eight (8) rotor poles 125. The SRM 100 also has concentrated coil windings 120 wound around the stator 105. The salient pole configuration on both the rotor 110 and the stator 105 provides a relatively simple manufacturing process and robust operation for SRM.

The coils 120 are wound around each stator pole 115 and connected together to create the phase windings for each phase. In an SRM, such as SRM 100, the coils 120 on diametrically opposite stator pole pairs are connected in series or in parallel to form a phase of the machine. SRMs may be designed with varying numbers of stator and rotor poles, and varying number of phases. In general, SRMs typically do not include excitation sources on the rotor 110. Also illustrated in SRM 100 is a rotor slot angle 130 formed between adjacent rotor poles 125.

In an SRM, such as SRM 100, reluctance torque is the sole torque producing mechanism. When phase windings on the stator poles 115 of SRM 100 are excited with current, the excited pole draws the nearest rotor pole 125 into alignment with it to minimize the reluctance in the phase. In order to create motoring torque, the phases are excited on the rising slope of their inductance profiles. In SRM 100, a plurality of magnetic flux lines 140 representing the magnetic flux between the rotor 110 and the stator 105 are also shown.

Figure 2:
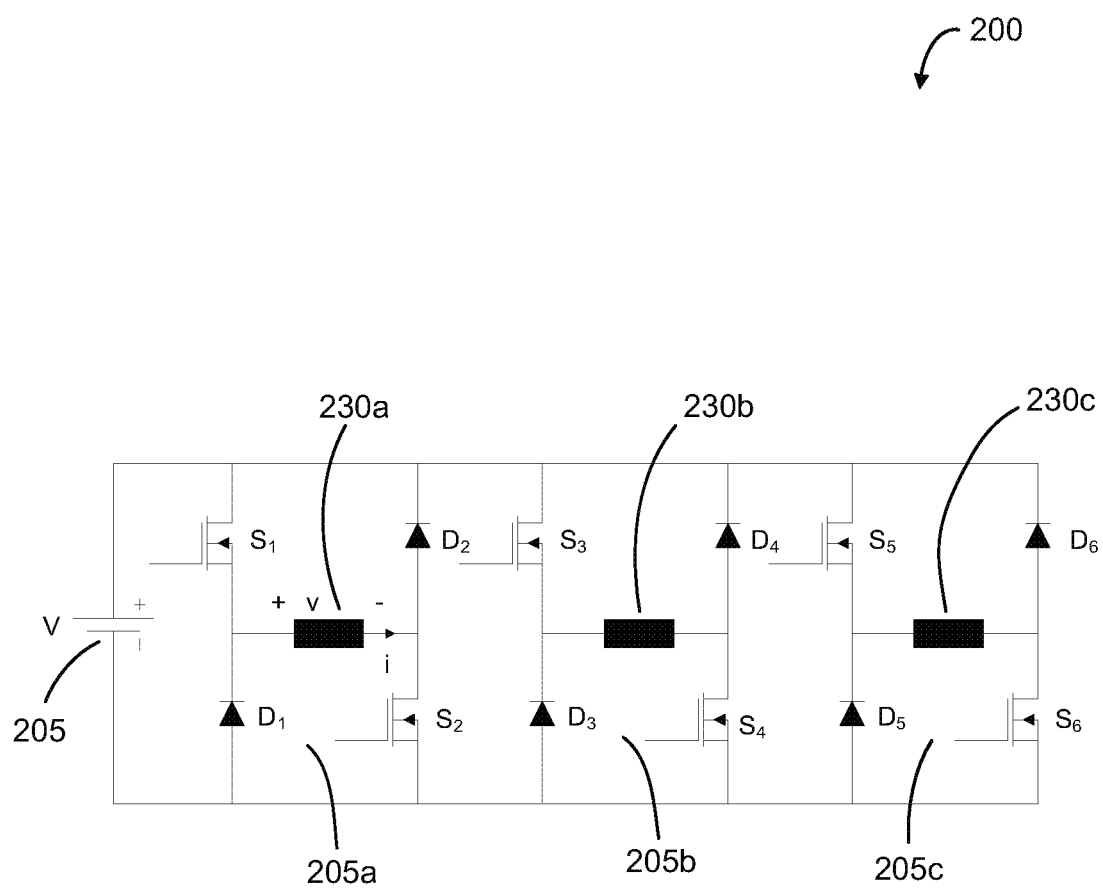
FIG. 2 shows an example of a circuit diagram of an asymmetric bridge converter for a three-phase SRM.

FIG. 2 shows an example circuit diagram of a three-phase asymmetric bridge converter 200 used to control a three-phase SRM, such as the three-phase SRM 100 of FIG. 1. In the asymmetric bridge converter 200, a power source (voltage source 205) is coupled to a plurality of phase coils 230*a*, 230*b* and 230*c* by switching sections 205*a*, 205*b* and 205*c* respectively. The asymmetric bridge converter 200 is used to electrically isolate the phase coils 230*a*, 230*b* and 230*c*. The individual phase coils 230*a*-230*c* may be energized and de-energized so that only one phase is active (i.e. receiving current) at a given time.

The phase windings in SRMs, such as SRM 100, are electrically isolated from each other. As a result, conventional inverters cannot be used to supply power to the phase coils 120. In SRM 100, the windings 120 in different phases may be energized as a function of the position of rotor 110. Typically, the current in each phase may be controlled by an asymmetric bridge converter, such as converter 200.

Figure 3:
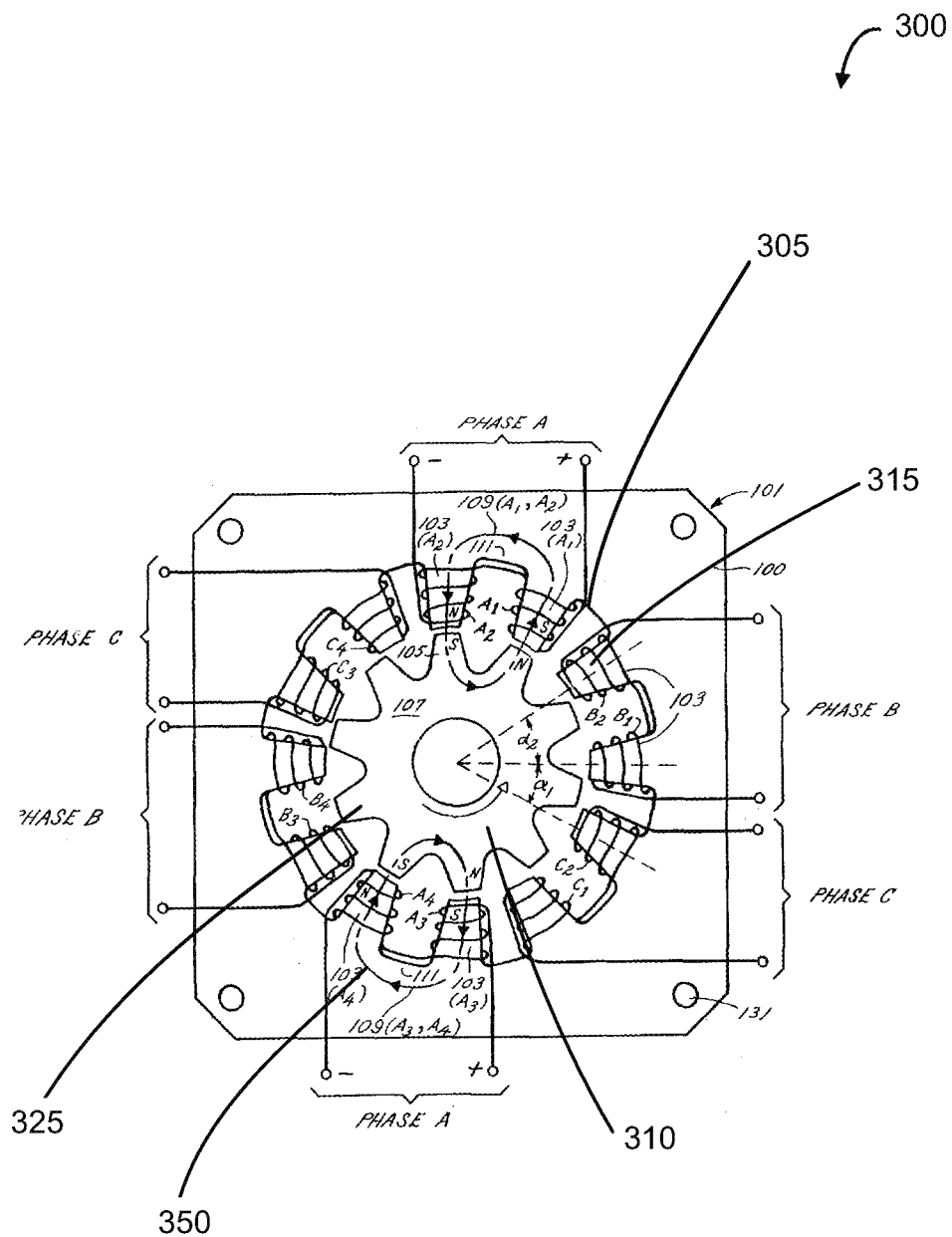
FIG. 3 shows a cross-sectional view of a switched reluctance machine according to another example.

Reference is next made to FIG. 3, which shows an example configuration of an SRM, such as SRM 300. SRM 300 has a stator 305 with twelve (12) stator poles 315, and a rotor 310 with ten (10) rotor poles 325. In the embodiment of FIG. 3, the SRM 300 has short-flux path 350 but has unevenly distributes poles. In particular, SRM 300 has evenly distributed rotor poles 325, but unevenly distributed stator poles 315.

Figure 4:
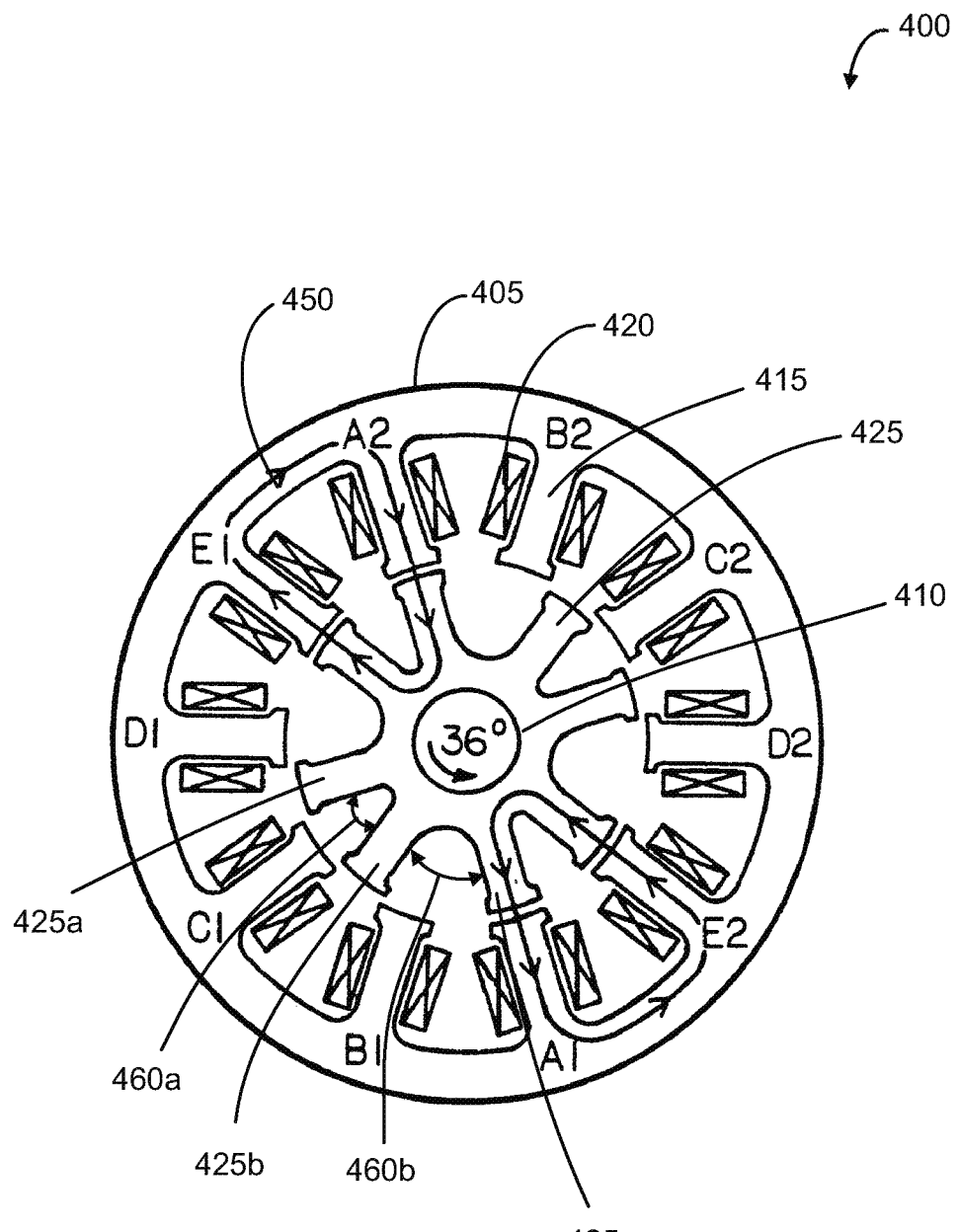
FIG. 4 shows a cross-sectional view of a switched reluctance machine according to a further example.

Reference is next made to FIG. 4, which shows an example configuration of an SRM, such as SRM 400. SRM 400 has a stator 405 and a rotor 410. Stator 405 has ten (10) stator poles 415 and rotor 410 has eight (8) rotor poles 425. Stator 405 has coil windings 420 wound around each stator pole 415.

In the embodiment of FIG. 4, the SRM 400 has short-flux path 450 but has unevenly distributes poles. In particular, SRM 400 has evenly distributed stator poles 415, but unevenly distributed rotor poles 425.

The unevenly distributed rotor poles 425 are further illustrated by way of rotor poles angles between various rotor poles 425. As shown, a first rotor pole angle 460*a* is formed between a first rotor pole 425*a* and a second rotor pole 425*b*. A second rotor pole angle 460*b* is formed between the second rotor pole 425*b* and a third rotor pole 425*c*. The first rotor pole angle 460*a* is different (in the illustrated embodiment, smaller) than the second rotor pole angle 460*b* indicating the uneven distribution of the rotor poles 425.

In the embodiments of FIGS. 3 and 4, having unevenly spaced stator poles or unevenly spaced rotor poles may produce side effects such as larger unbalancing forces, torque ripple, acoustic noise and vibration.

Figure 5:
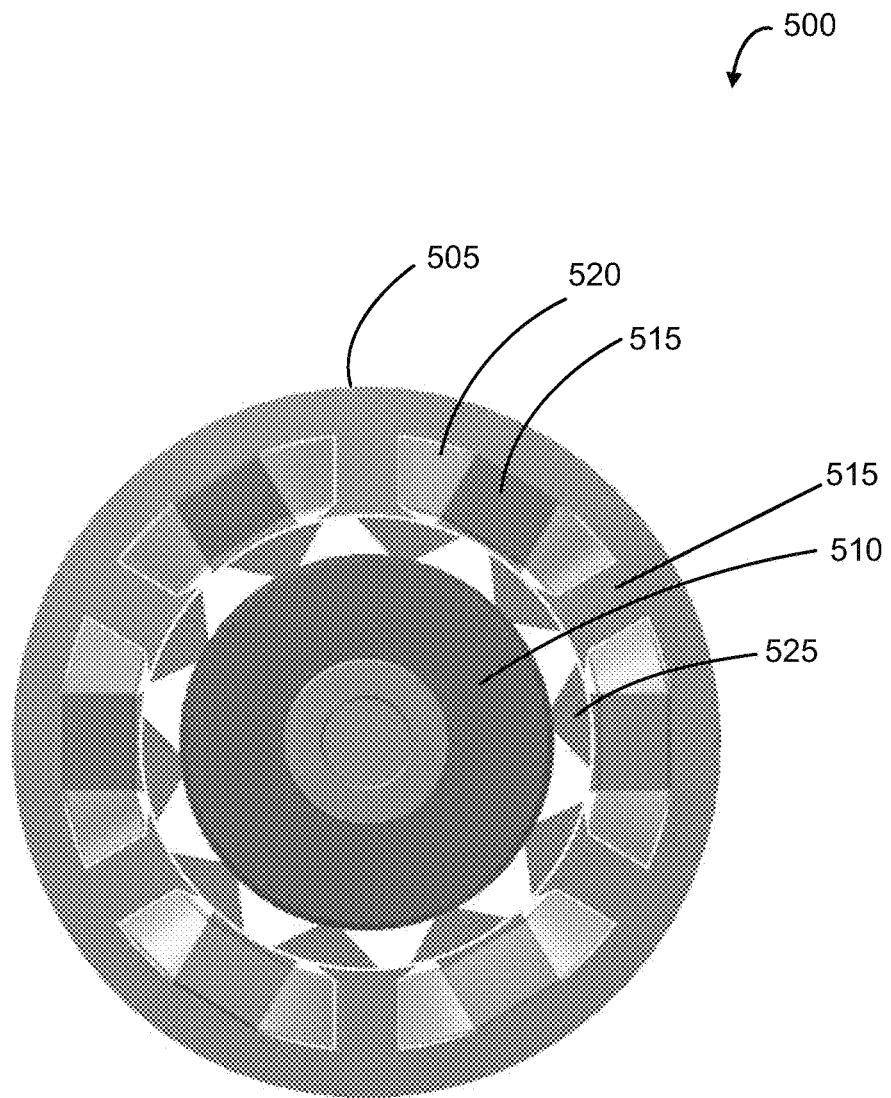
FIG. 5 shows a cross-sectional view of a switched reluctance machine according to another example.

Reference is next made to FIG. 5, which shows an example configuration of an SRM, such as SRM 500. SRM 500 has a stator 505 and a rotor 510. Stator 505 has stator poles 515 with uneven stator pole widths. Rotor 510 has a segmented rotor with ten (10) rotor segments 525. In the embodiment of FIG. 5, a short-flux path is generated in the SRM 500.

SRM 500 has a stator 505 with twelve (12) stator poles 515 but only six (6) stator poles 515' have coil windings 520 wound around them. Also, as shown, the width of the stator poles 515' without coils is not the same as the width of the stator poles 515 with coils. These features may pose challenges in the proper use, manufacturing, and control of the motor.

The SRM configuration in FIG. 5 has an asymmetrical structure, which may make it difficult to manufacture the SRM. In addition, such an asymmetrical structure may cause increased unbalancing forces, torque ripple, acoustic noise and vibrations.

Figure 6:
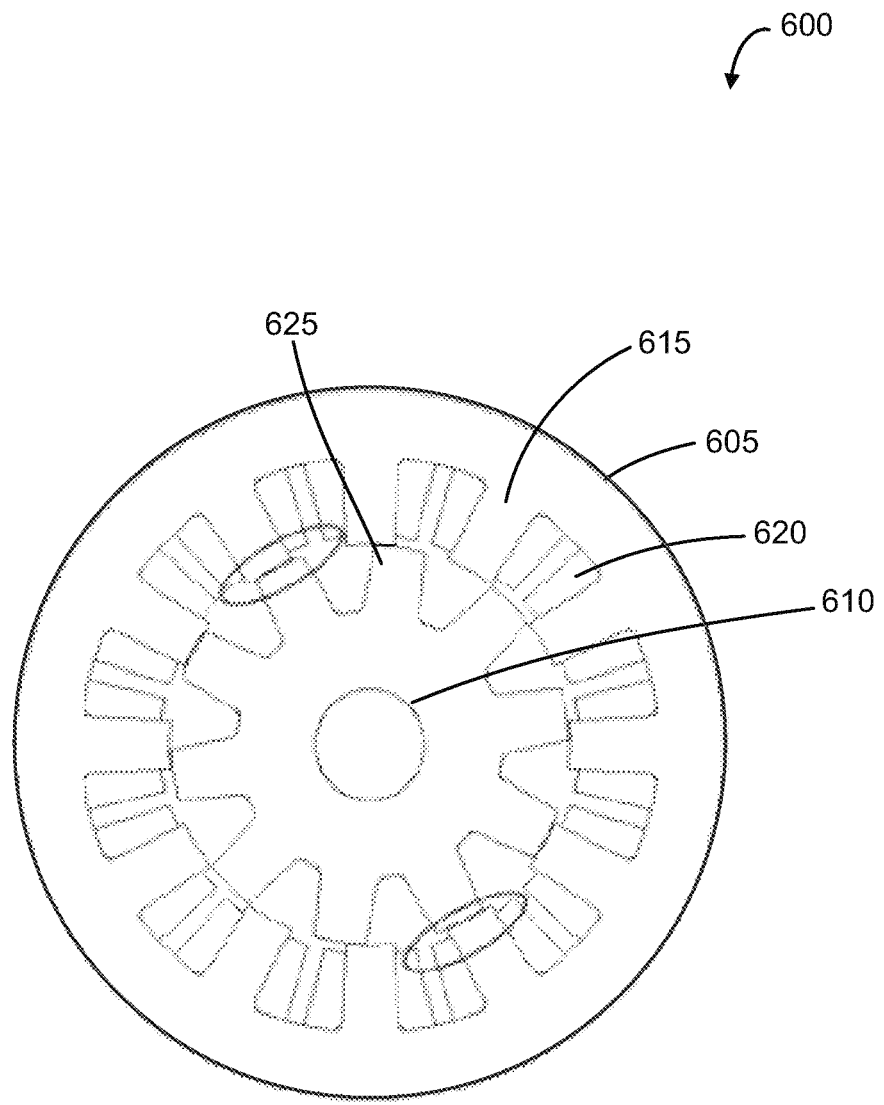
FIG. 6 shows a cross-sectional view of a switched reluctance machine according to another example.

Reference is next made to FIG. 6, which shows an example configuration of an SRM, such as SRM 600. SRM 600 has a stator 605 and a rotor 610. Stator 605 has twelve (12) stator poles 615, and rotor 610 has ten (10) rotor poles 625. Stator 605 has coil windings 620 wound around each stator pole 615.

In the embodiment of FIG. 6, a short-flux path is generated in the SRM 600. However, these generally symmetrical short-flux path SRM embodiments are limited to the configurations where the number of stator poles 615 is higher than the number of rotor poles 625.

Figure 7:
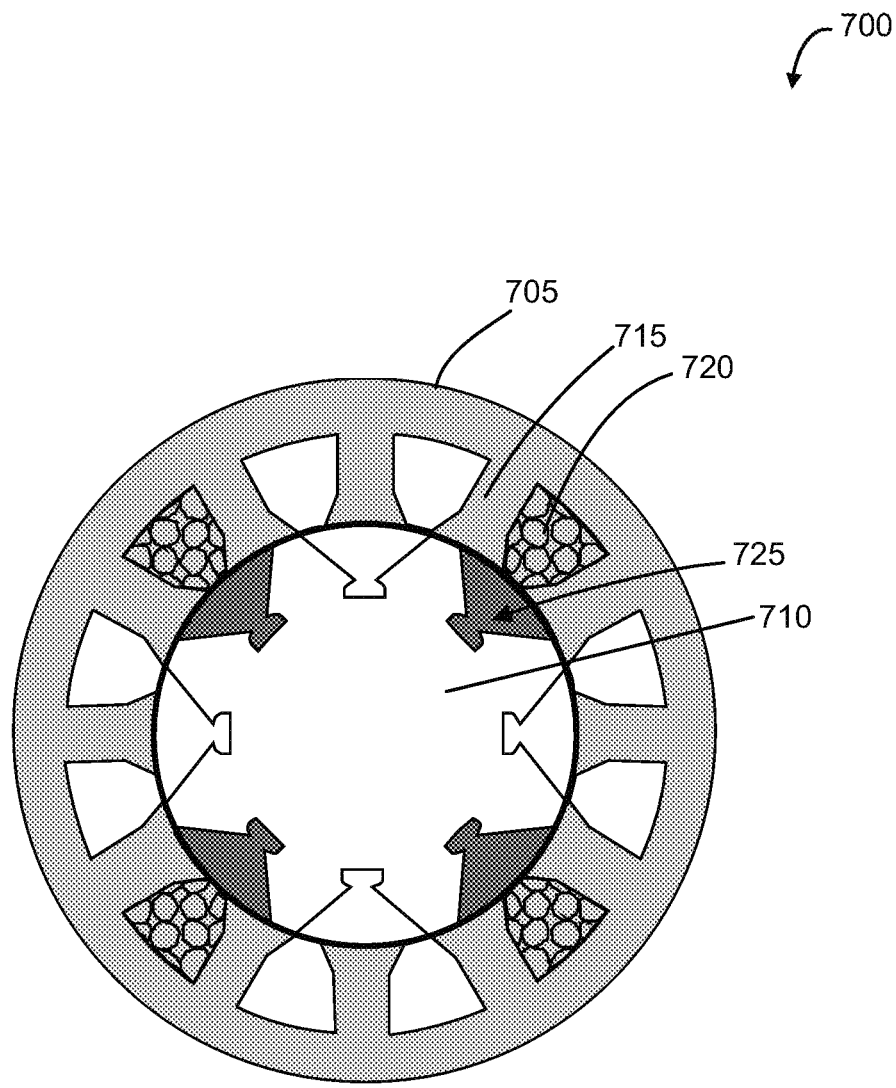
FIG. 7 shows a cross-sectional view of a switched reluctance machine according to a further example.

Reference is next made to FIG. 7, which shows an example configuration of an SRM, such as SRM 700. FIG. 7 shows a stator 705 and a rotor 710. Stator 705 has twelve (12) stator poles 715, and rotor 710 has eight (8) rotor segments 725. Stator 705 has coil windings 720 wound around some, but not all, stator poles 715. This embodiment of FIG. 7 with distributed windings 720 results in short-flux paths in the SRM 700.

In the various embodiment of FIGS. 8A-11C, SRM configurations with symmetric stator and rotor poles and short-flux paths are shown. Short-flux paths may provide the advantage of lower core losses making the SRM more efficient. In addition, symmetric configuration of the SRM may provide the advantage of easier and cheaper manufacturing. The various SRM configurations discussed below can be applied to various SRMs, including radial flux, axial flux, interior rotor, and exterior rotor machines.

Figure 8A:
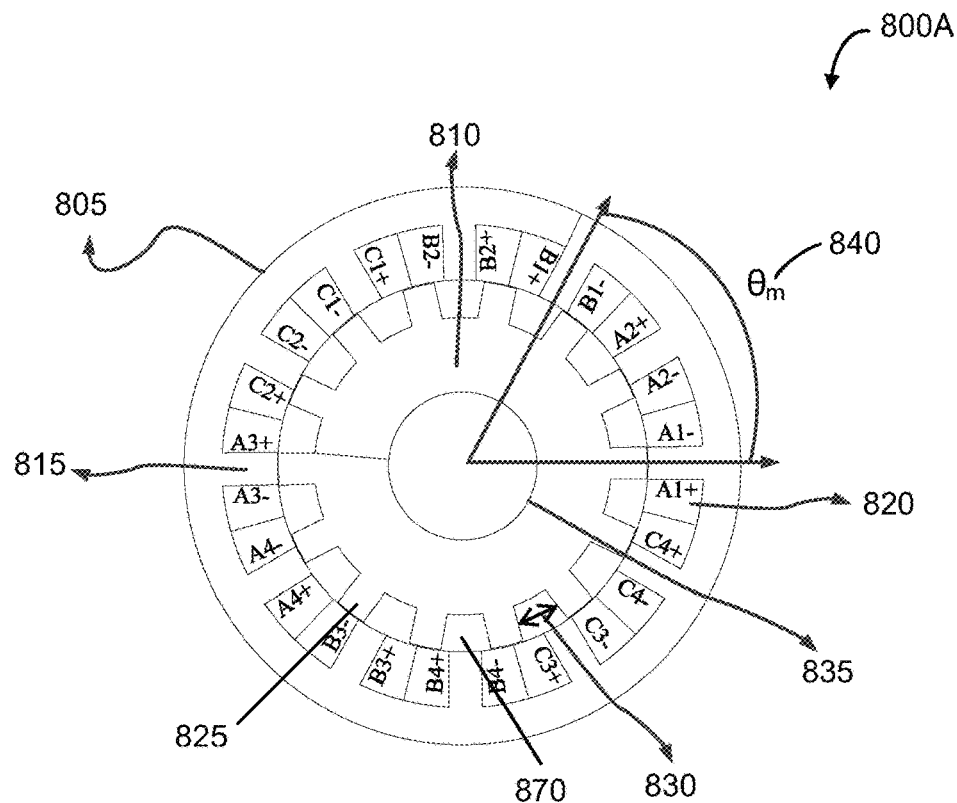
FIG. 8A shows a cross-sectional view of a switched reluctance machine according to an example.

FIG. 8A shows a cross-sectional view of a three-phase SRM 800A. SRM 800A has a stator 805 and a rotor 810, where the stator 805 and rotor 810 are disposed concentrically and coaxially with one another and with a shaft 835. In the SRM 800, the rotor 810 is positioned radially inward of the stator 805.

As shown, the SRM has twelve (12) stator poles 815 and fourteen (14) rotor poles 825. In this configuration of SRM 800A, coils 820 are wound around the stator poles 815 to provide a three-phase SRM. Each phase in the three-phase SRM 800A has adjacent stator coils wound in opposite directions, such that two adjacent stator poles have opposite-polarity coils. SRM 800A has a symmetric construction with a higher number of rotor poles 825 than stator poles 815.

Also shown in FIG. 8A are a rotor slot angle 830 and a mechanical angle 840. Rotor slot angle 830 is the angle between adjacent rotor poles 825, or the angle formed by a rotor slot 870. The mechanical angle $\theta_m$ 840 is the angle between two consecutive phases.

Figure 8B:
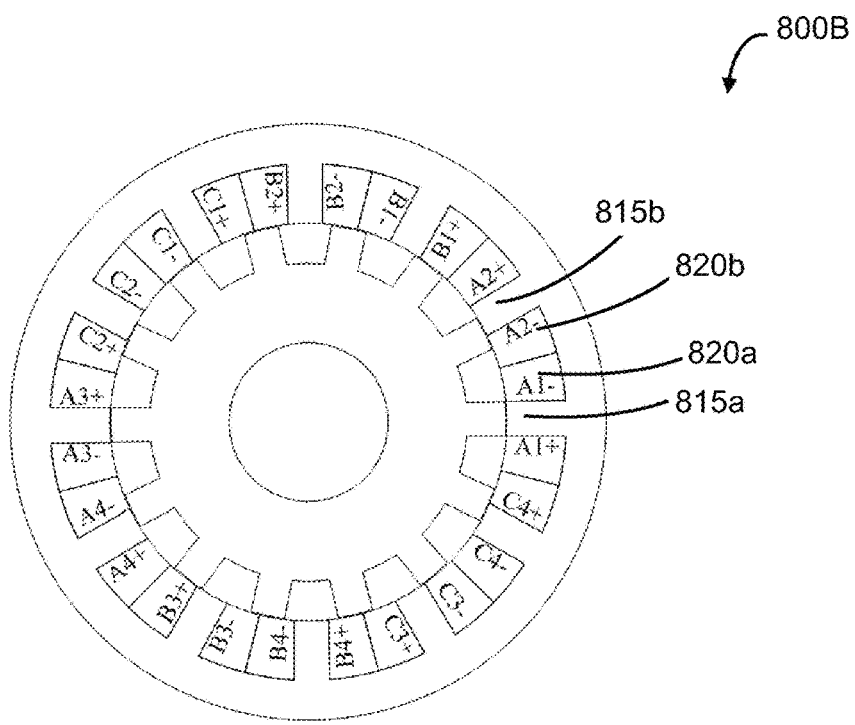
FIG. 8B shows an example view of the winding scheme of the switched reluctance machine of FIG. 8A.

FIG. 8B shows an example configuration of SRM, such as SRM 800B. In particular, FIG. 8B shows a stator pole winding scheme, including the phase and polarity, of SRM 800A. As shown, stator poles 815a and 815b have windings with opposite polarities. For example, stator pole 815a has windings 820a with a first polarity A1+-A1-, and stator pole 815b has windings 820b with a second opposing polarity A2--A2+.

Figure 8C:
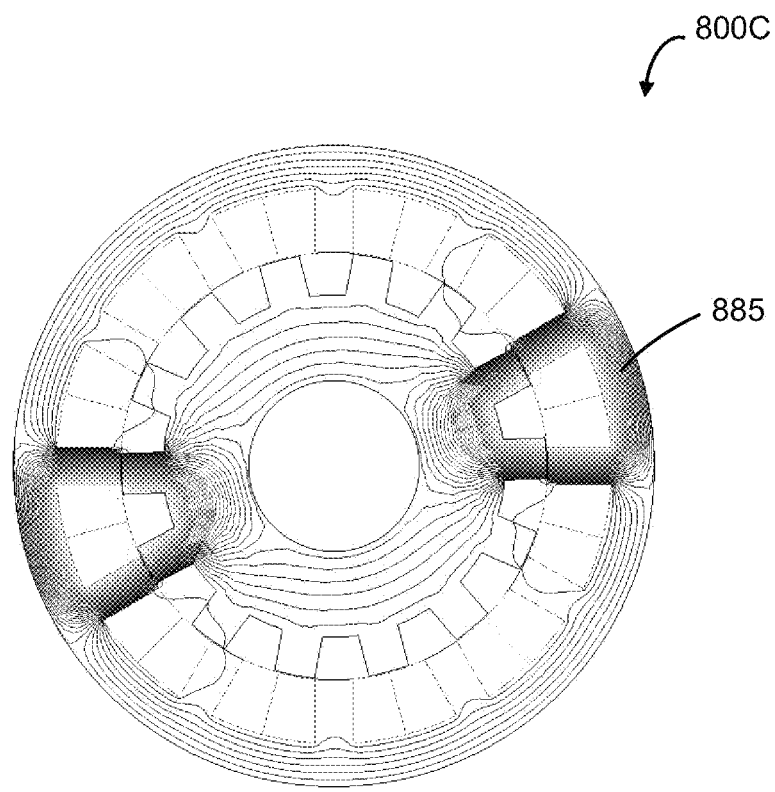
FIG. 8C shows a cross-sectional view of the switched reluctance machine of FIG. 8A in an aligned position according to an example.

FIG. 8C shows an example configuration of SRM, such as SRM 800C. In particular, FIG. 8C shows the magnetic flux lines 885 when the SRM 800A is in an aligned position. In an aligned position, the center of a rotor pole 825 is aligned with a center of the stator pole 815. Maximum inductance occurs when the rotor poles 825 and stator poles 815 are aligned.

Figure 8D:
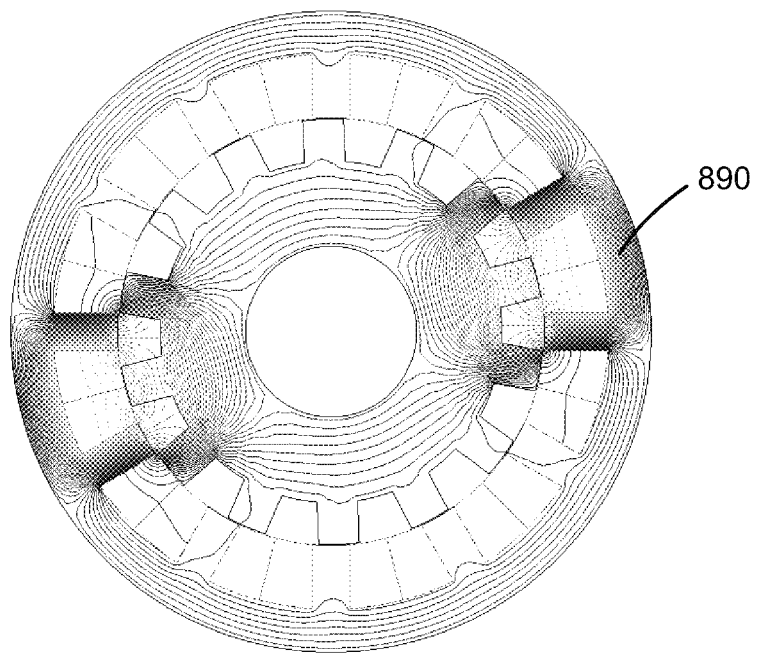
FIG. 8D shows a cross-sectional view of the switched reluctance machine of FIG. 8A in an unaligned position according to an example.

FIG. 8D shows an example configuration of SRM, such as SRM 800D. In particular, FIG. 8D shows the magnetic flux lines 890 when the SRM 800A is in an unaligned position. In the unaligned position, the center of a rotor slot 870 is aligned with the center of a stator pole 815. Minimal inductance occurs when the rotor poles 825 and stator poles 815 are unaligned.

As shown in FIGS. 8C and 8D, two short-flux paths in opposite directions are generated in this embodiment. Since the magnetic flux lines represent machine periodicity, the number of machine periodicity in the embodiments of FIGS. 8A-8D is 2.

In the various embodiments disclosed herein, the number of machine periodicity may be determined from the flux paths, based on equation (1) provided below. In equation (1), $N_s$ is number of stator poles 815, $N_r$ is number of rotor poles 825 and LCM ($N_s$, $N_r$) is the lowest common multiple of $N_s$ and $N_r$:

$$MP = \frac{N_s N_r}{LCM(N_s, N_r)} \quad (1)$$

In the various embodiments illustrated herein, the number of machine periodicity may be determined based on a relationship between mechanical angle ($\theta_m$) 840 and electrical angle ($\theta_e$).

$$\theta_e = MP \times \theta_m \quad (2)$$

Equation (2) may be rearranged to provide equations (3) and (4):

$$\frac{2\pi}{N_{ph}} = MP \times \frac{2\pi \times 2}{N_s} \quad (3)$$

$$N_s = MP \times 2 \times N_{ph} \quad (4)$$

Based on equations (1) and (4), a relationship between a number of stator poles ($N_s$) 910, number of rotor poles ($N_r$) 925, and a number of phases ($N_{ph}$) may be determined using equation (5), provided that $N_r > N_s$:

$$N_r = \frac{LCM(N_s, N_r)}{2 \times N_{ph}} \quad (5)$$

In the various embodiments illustrated herein, based on equation (5) and at least one constraint condition, a number of stator poles 910 and rotor poles 925 for various topologies of SRM, such as interior rotor, exterior rotor and axial flux SRM etc., may be determined. As well, SRMs based on equation (5) product short-flux paths configurations for SRMs.

In the various embodiments disclosed herein, one constraint condition requires that the number of rotor poles and the number of stator poles of the SRMs are even numbers. In addition, another constraint condition requires that the number of rotor poles is greater than the number of stator poles.

Figure 9A:
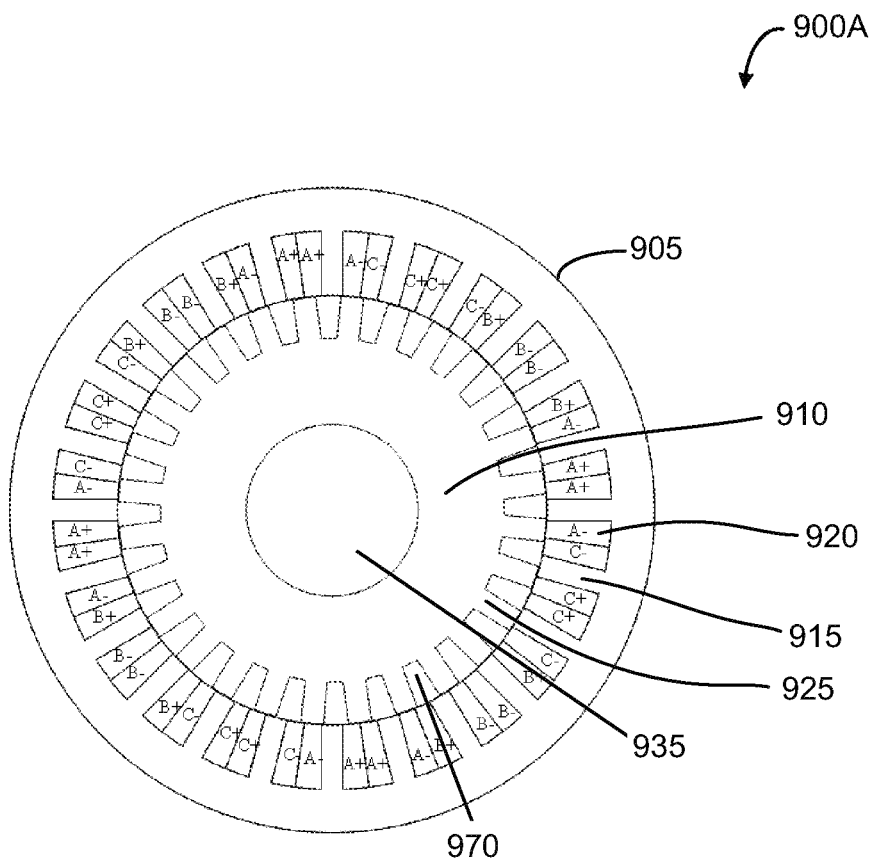
FIG. 9A shows a cross-sectional view of a switched reluctance machine according to an example.

Reference is next made to FIG. 9A, which shows a cross-sectional view of a three-phase SRM 900A. SRM 900A has a stator 905 and a rotor 910, where the stator 905 and rotor 910 are disposed concentrically and coaxially with one another and with a shaft 935. In the SRM 900, the rotor 910 is positioned radially inward of the stator 905.

As shown, the SRM has twenty-four (24) stator poles 915 and twenty-eight (28) rotor poles 925. In this configuration of SRM 900A, coils 920 are wound around the stator poles 915 to provide a three-phase SRM. Each phase in the three-phase SRM 900A has adjacent stator coils wound in opposite directions, such that two adjacent stator poles have opposite-polarity coils. SRM 900A has a symmetric construction with a higher number of rotor poles 925 than stator poles 915.

FIG. 9A also shows the geometry of windings 920, including phase and polarity, wound around the stator poles 915. Windings 920 are wrapped in directions that energize adjacent stator poles 915 with opposite-polarity coils.

Figure 9B:
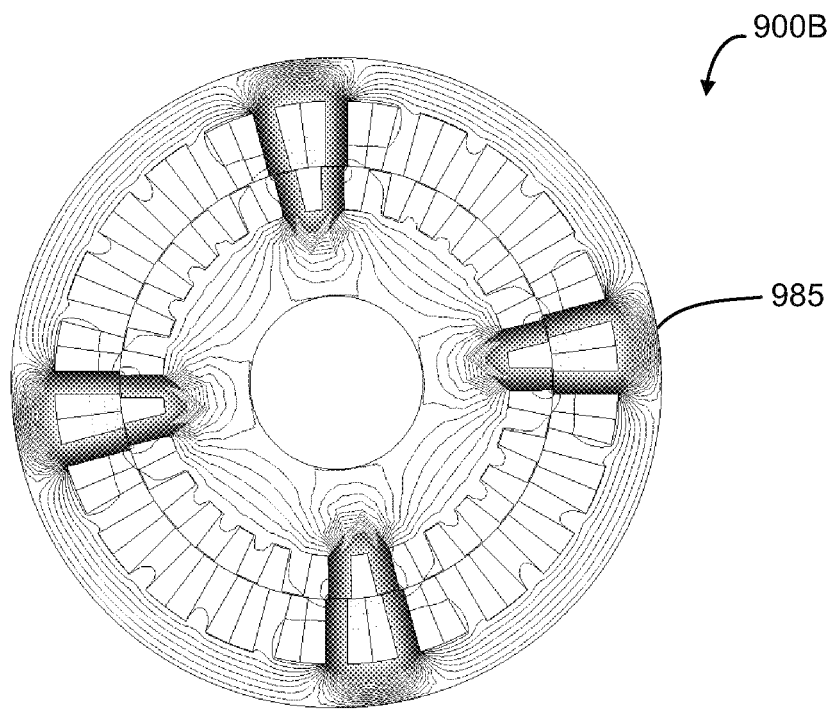
FIG. 9B shows a cross-sectional view of the switched reluctance machine of FIG. 9A in an aligned position according to an example.

FIG. 9B shows an example configuration of SRM, such as SRM 900B. In particular, FIG. 9B shows the magnetic flux lines 985 when the SRM 900A is in an aligned position. In an aligned position, the center of a rotor pole 925 is aligned with a center of the stator pole 915. Maximum inductance occurs when the rotor poles 925 and stator poles 915 are aligned.

Figure 9C:
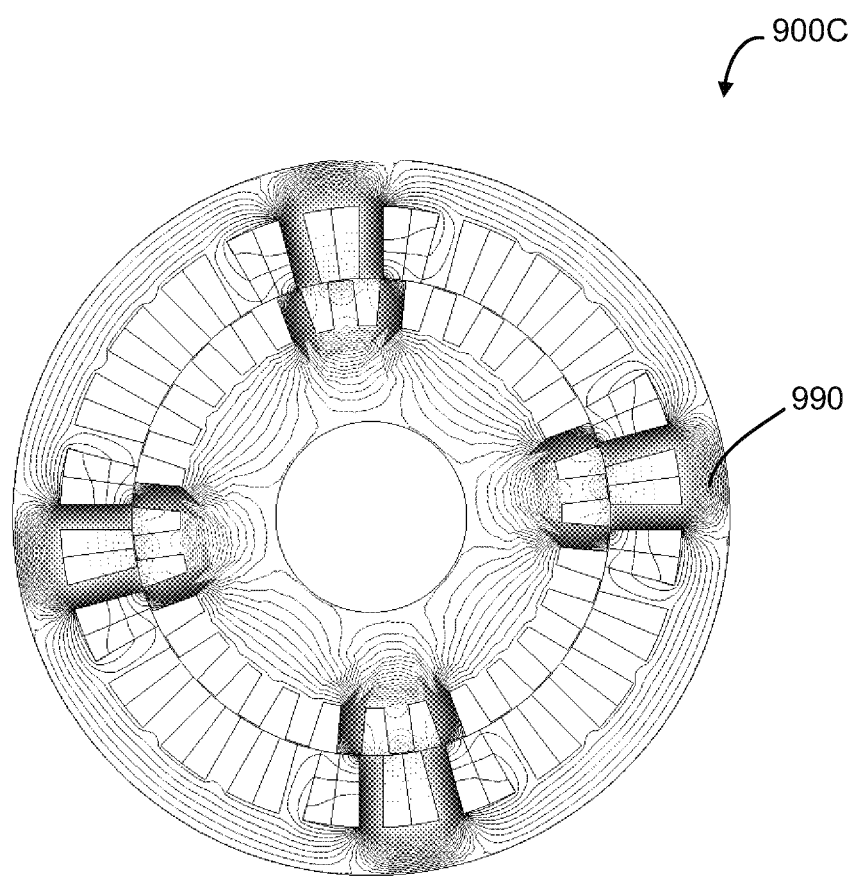
FIG. 9C shows a cross-sectional view of the switched reluctance machine of FIG. 9A in an unaligned position according to an example.

FIG. 9C shows an example configuration of SRM, such as SRM 900C. In particular, FIG. 9C shows the magnetic flux lines 990 when the SRM 900A is in an unaligned position. In the unaligned position, the center of a rotor slot 970 is aligned with the center of a stator pole 915. Minimal inductance occurs when the rotor poles 925 and stator poles 915 are unaligned.

As shown in FIGS. 9B and 9C, four short-flux paths in opposite directions are generated in this embodiment. Since the magnetic flux lines represent machine periodicity, the number of machine periodicity in the embodiments of FIGS. 9A-9C is 4.

Figure 10A:
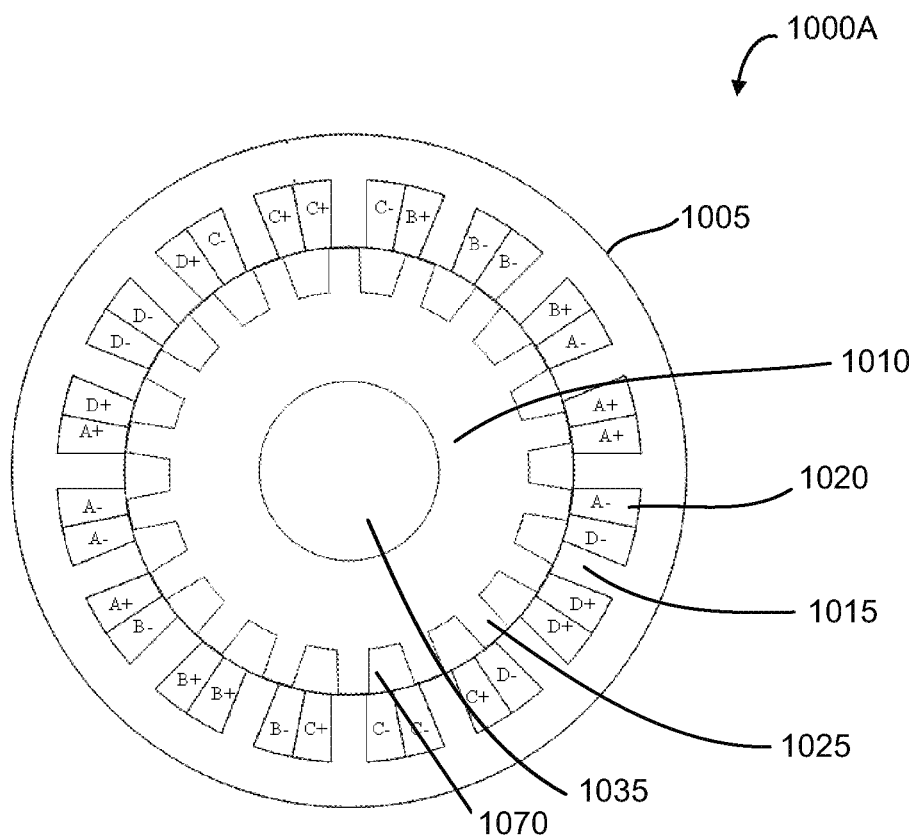
FIG. 10A shows a cross-sectional view of a switched reluctance machine according to an example.

Reference is next made to FIG. 10A, which shows a cross-sectional view of a four-phase SRM 1000A. SRM 1000A has a stator 1005 and a rotor 1010, where the stator 1005 and rotor 1010 are disposed concentrically and coaxially with one another and with a shaft 1035. In the SRM 1000, the rotor 1010 is positioned radially inward of the stator 1005.

As shown, the SRM has sixteen (16) stator poles 1015 and eighteen (18) rotor poles 1025. In this configuration of SRM 1000A, coils 1020 are wound around the stator poles 1015 to provide a four-phase SRM. SRM 1000A has a symmetric construction with a higher number of rotor poles 1025 than stator poles 1015.

FIG. 10A also shows the geometry of windings 1020, including phase and polarity, wound around the stator poles 1015. Each phase in the four-phase SRM 1000A has adjacent stator coils wound in opposite directions, such that two adjacent stator poles 1015 have opposite-polarity coils.

Figure 10B:
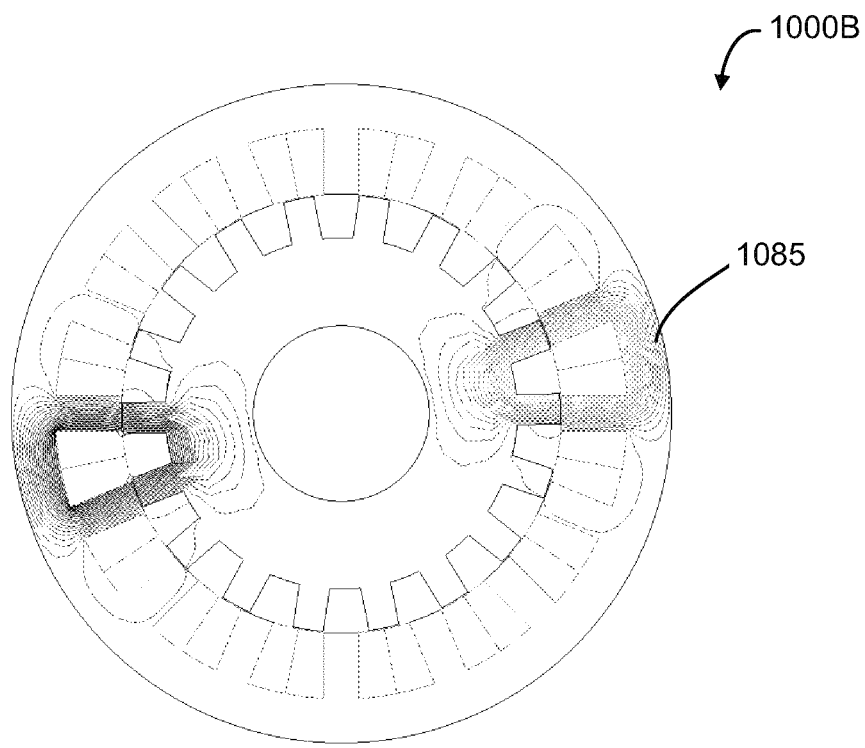
FIG. 10B shows a cross-sectional view of the switched reluctance machine of FIG. 10A in an aligned position according to an example.

FIG. 10B shows an example configuration of SRM, such as SRM 1000B. In particular, FIG. 10B shows the magnetic flux lines 1085 when the SRM 1000A is in an aligned position. In an aligned position, the center of a rotor pole 1025 is aligned with a center of the stator pole 1015. Maximum inductance occurs when the rotor poles 1025 and stator poles 1015 are aligned.

Figure 10C:
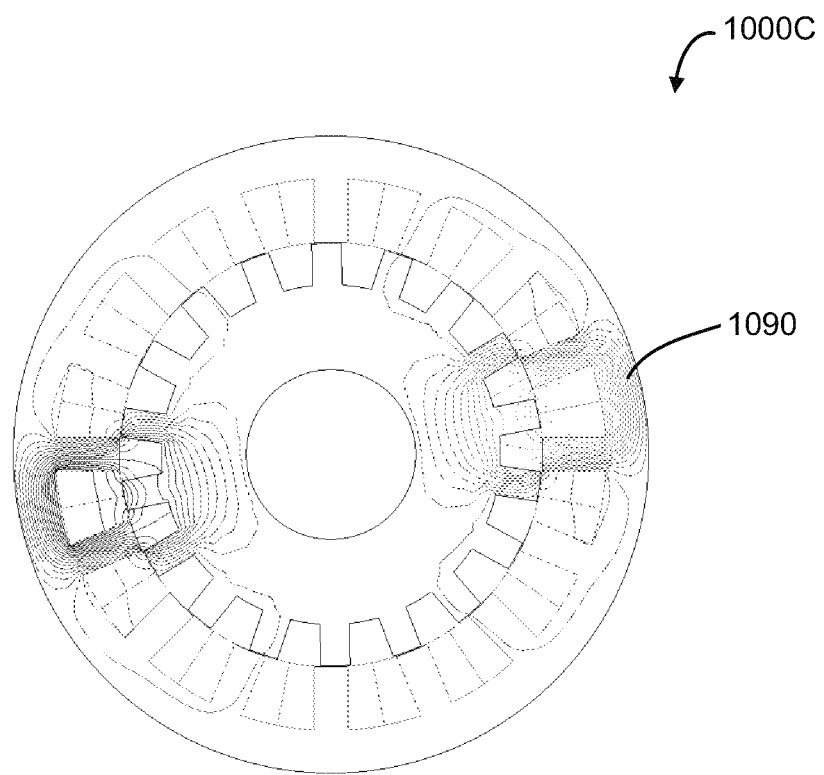
FIG. 10C shows a cross-sectional view of the switched reluctance machine of FIG. 10A in an unaligned position according to an example.

FIG. 10C shows an example configuration of SRM, such as SRM 1000C. In particular, FIG. 10C shows the magnetic flux lines 1090 when the SRM 1000A is in an unaligned position. In the unaligned position, the center of a rotor slot 1070 is aligned with the center of a stator pole 1015. Minimal inductance occurs when the rotor poles 1025 and stator poles 1015 are unaligned.

As shown in FIGS. 10B and 10C, two short-flux paths in opposite directions are generated in this embodiment. Since the magnetic flux lines represent machine periodicity, the number of machine periodicity in the embodiments of FIGS. 10A-10C is 2.

Figure 11A:
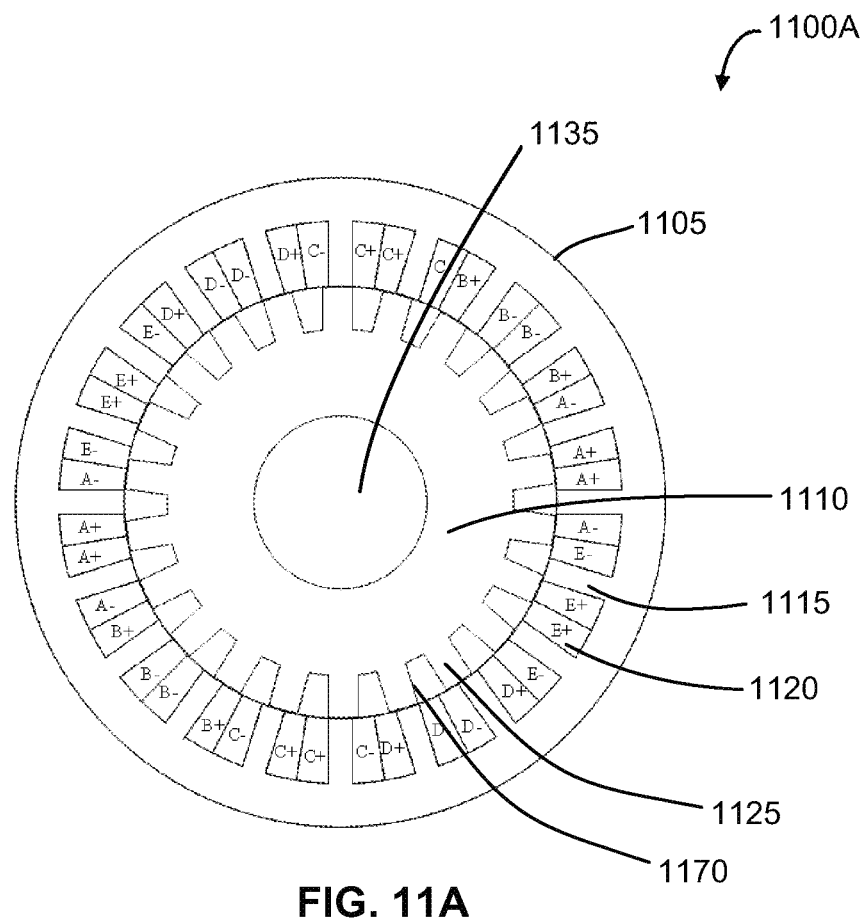
FIG. 11A shows a cross-sectional view of a switched reluctance machine according to an example.

Reference is next made to FIG. 11A, which shows a cross-sectional view of a five-phase SRM 1100A. SRM 1100A has a stator 1105 and a rotor 1110, where the stator 1105 and rotor 1110 are disposed concentrically and coaxially with one another and with a shaft 1135. In the SRM 1100, the rotor 1110 is positioned radially inward of the stator 1105.

As shown, the SRM has twenty (20) stator poles 1115 and twenty-two (22) rotor poles 1125. In this configuration of SRM 1100A, coils 1120 are wound around the stator poles 1115 to provide a five-phase SRM. SRM 1100A has a symmetric construction with a higher number of rotor poles 1125 than stator poles 1115.

FIG. 11A also shows the geometry of windings 1120, including phase and polarity, wound around the stator poles 1115. Each phase in the five-phase SRM 1100A has adjacent stator coils wound in opposite directions, such that two adjacent stator poles 1115 have opposite-polarity coils.

Figure 11B:
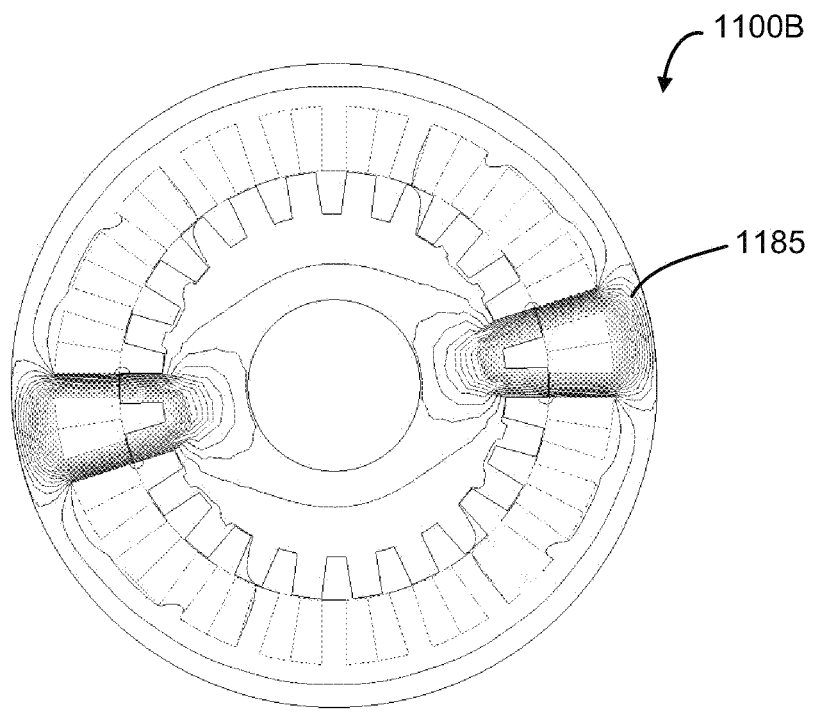
FIG. 11B shows a cross-sectional view of the switched reluctance machine of FIG. 11A in an aligned position according to an example.

FIG. 11B shows an example configuration of SRM, such as SRM 1100B. In particular, FIG. 11B shows the magnetic flux lines 1185 when the SRM 1100A is in an aligned position. In an aligned position, the center of a rotor pole 1125 is aligned with a center of the stator pole 1115. Maximum inductance occurs when the rotor poles 1125 and stator poles 1115 are aligned.

Figure 11C:
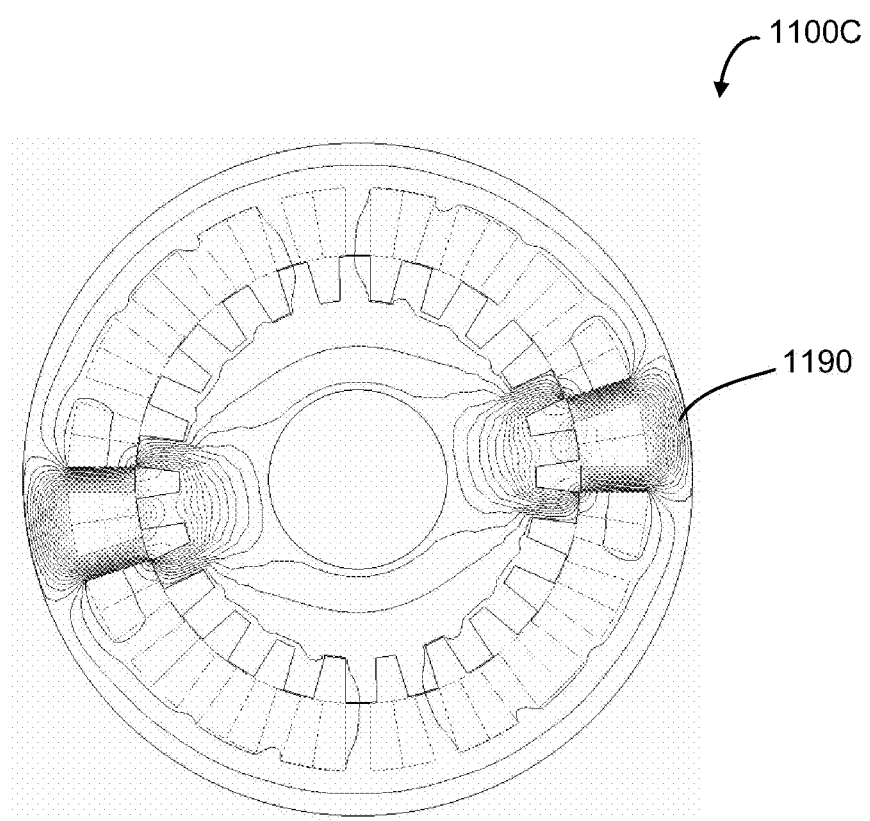
FIG. 11C shows a cross-sectional view of the switched reluctance machine of FIG. 11A in an unaligned position according to an example.

FIG. 11C shows an example configuration of SRM, such as SRM 1100C. In particular, FIG. 11C shows the magnetic flux lines 1190 when the SRM 1100A is in an unaligned position. In the unaligned position, the center of a rotor slot 1170 is aligned with the center of a stator pole 1115. Minimal inductance occurs when the rotor poles 1125 and stator poles 1115 are unaligned.

As shown in FIGS. 11B and 11C, two short-flux paths in opposite directions are generated in this embodiment. Since the magnetic flux lines represent machine periodicity, the number of machine periodicity in the embodiments of FIGS. 11A-11C is 2.

Various SRM configurations determined based on equation (5) are provided below. Table 1 provides SRM configurations for three-phase, multi-teeth SRMs:

| $N_{ph}$ | $N_s$ | $N_r$ | Short flux path SRM |
|---|---|---|---|
| 3 | 12 | 14 | 12/14 |
|   | 12 | 22 | 12/22 |
|   | 12 | 26 | 12/26 |
|   | 24 | 28 | 24/28 |
|   | 36 | 42 | 36/42 |

Table 2 provides SRM configurations for four-phase, multi-teeth SRMs:

| $N_{ph}$ | $N_s$ | $N_r$ | Short flux path SRM |
|---|---|---|---|
| 4 | 16 | 18 | 16/18 |
|   | 16 | 22 | 16/22 |
|   | 16 | 26 | 16/26 |
|   | 16 | 30 | 16/30 |
|   | 32 | 36 | 32/36 |
|   | 32 | 44 | 32/44 |

Table 3 provides SRM configurations for five-phase, multi-teeth SRMs:

| $N_{ph}$ | $N_s$ | $N_r$ | Short flux path SRM |
|---|---|---|---|
| 5 | 20 | 22 | 20/22 |
|   | 20 | 26 | 20/26 |
|   | 20 | 34 | 20/34 |
|   | 20 | 38 | 20/38 |
|   | 40 | 44 | 40/44 |

While the present application has been described with reference to examples, it is to be understood that the scope of the claims should not be limited by the embodiments set forth in the examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

We claim:

1. A switched reluctance machine comprising:
an axially extending shaft;
an axially extending rotor mounted to the shaft, the rotor having a plurality of salient rotor poles;
an axially extending stator disposed coaxially and concentrically with the rotor, the stator having a plurality of salient stator poles protruding radially from the stator towards the rotor poles; and
a plurality of electrical coils wound about the stator poles, the plurality of electrical coils including a plurality of separate phase coils defining a plurality of phases of the switched reluctance machine,
wherein a number of rotor poles is related to a number of stator poles, a number of stator teeth, and a number of phases, according to equation (1) and at least one constraint condition:

$$N_r = \frac{LCM(N_s, N_r)}{2 \times N_{ph}} \quad (1)$$

wherein $N_{ph}$ is the number of phases, $N_s$ is the number of stator poles, $N_r$ is the number of rotor poles, and LCM is the lowest common multiple of number of stator poles and number of rotor poles, wherein the at least one constraint comprises the number of rotor poles being greater than the number of stator poles.

2. The switched reluctance machine of claim 1, wherein the at least one constraint condition further comprises an even number of rotor poles, and an even number of stator poles.

3. The switched reluctance machine of claim 1, wherein the at least one constraint condition further comprises winding adjacent stator poles with electrical coils having opposite polarities.

4. The switched reluctance machine of claim 1, wherein when in operation, generates at least one short flux-path.

5. The switched reluctance machine of claim 1, wherein the stator is generally symmetric, and the plurality of stator poles being equidistant from each other.

6. The switched reluctance machine of claim 1, wherein the rotor is generally symmetric, and the plurality of rotor poles being equidistant from each other.

7. A method of manufacturing a switched reluctance machine having an axially extending shaft, an axially extending rotor mounted to the shaft, an axially extending stator disposed coaxially and concentrically with the rotor, the rotor having a plurality of salient rotor poles, the stator having a plurality of salient stator poles protruding radially from the stator towards the rotor poles, the switched reluctance machine further having a plurality of electrical coils wound about the plurality of stator poles to define a plurality of phases of the switched reluctance machine, the method comprising:

determining a number of rotor poles according to equation (1) and at least one constraint condition:

$$N_r = \frac{LCM(N_s, N_r)}{2 \times N_{ph}} \quad (1)$$

wherein $N_{ph}$ is the number of phases, $N_s$ is the number of stator poles, $N_r$ is the number of rotor poles, and LCM is the lowest common multiple of number of stator poles and number of rotor poles, and wherein the at least one constraint condition comprises the number of rotor poles being greater than the number of stator poles.

8. The method of claim 7, wherein the at least one constraint condition further comprises an even number of rotor poles, and an even number of stator poles.

9. The method of claim 7, wherein the at least one constraint condition further comprises winding adjacent stator poles with electrical coils having opposite polarities.

10. The method of claim 7, wherein when in operation, generates at least one short flux-path.

11. The method of claim 7, wherein the stator is generally symmetric, the plurality of stator poles being equidistant from each other.

12. The method of claim 7, wherein the rotor is generally symmetric, the plurality of rotor poles being equidistant from each other.

* * * * *